(No Model.)
L. P. BAUER.
MANUFACTURE OF GLUCOSE OR SUGAR.
No. 576,998. Patented Feb. 16, 1897.
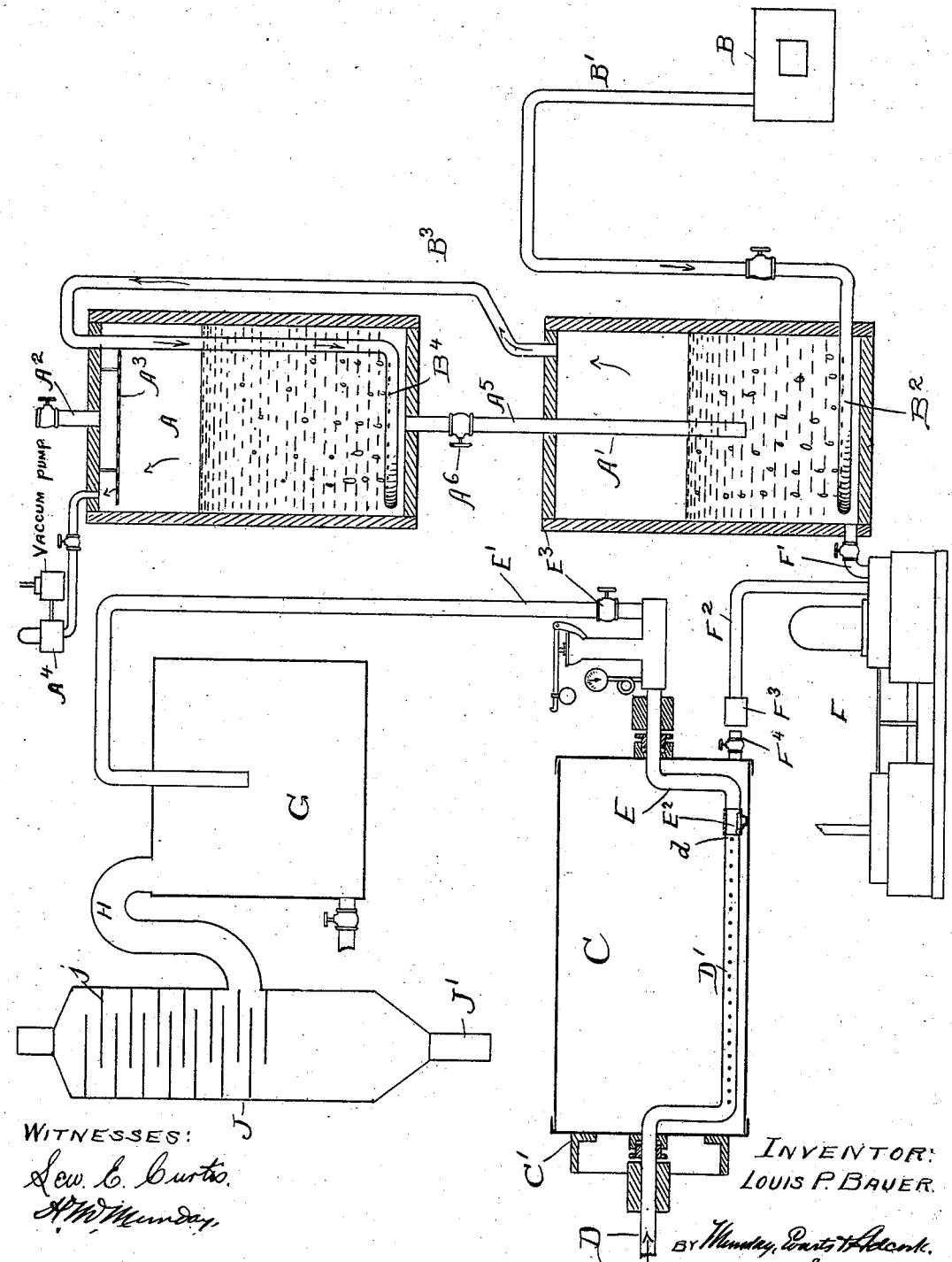
WITNESSES:
INVENTOR:
LOUIS P. BAUER.
BY his ATTORNEYS.

UNITED STATES PATENT OFFICE.

LOUIS P. BAUER, OF CHICAGO, ILLINOIS.

MANUFACTURE OF GLUCOSE OR SUGAR.

SPECIFICATION forming part of Letters Patent No. 576,998, dated February 16, 1897.

Application filed October 7, 1895. Serial No. 564,856. (No model.)

*To all whom it may concern:*

Be it known that I, LOUIS P. BAUER, a citizen of the United States, residing in Chicago, in the county of Cook and State of Illinois, have invented a new and useful Improvement in the Manufacture of Glucose or Sugar, of which the following is a specification.

This invention relates to an improvement in the manufacture of glucose or grape-sugar from starch.

The nature of the invention will be understood from the following specification, aided by the accompanying drawing, in which drawing is shown an apparatus suitable for practicing the invention.

The method practiced for manufacturing glucose or grape-sugar from corn has been, briefly, as follows: The corn is first steeped in a week solution of sulfurous acid in order to facilitate the separation of the starch from the gluten of the grain. Then the starch is removed by the usual and well-known methods, which need not be described. After the starch is obtained it is converted into glucose or sugar by boiling it under pressure with the admixture of an acid, such as muriatic, sulfuric, or oxalic acid. After the conversion has been effected the acid is neutralized by a suitable alkali. For sulfuric acid carbonate of lime is employed, and for muriatic or oxalic acid soda is used. Where sulfuric acid is employed and neutralized, it is found very troublesome and expensive to remove the precipitate consisting of sulfates of lime, &c., and for this reason most of the factories have abandoned the use of sulfuric acid and adopted muriatic acid as the converting agent, but although muriatic acid, being neutralized with soda, forms no precipitate and does away with the expense of removing a precipitate, still the use of this converting agent and its neutralization leaves a salt in solution which cannot be removed, and therefore, though cheaper, results in the production of an article of glucose or sugar inferior even in quality to that converted with sulfuric acid, and which article is entirely unfit for use for certain purposes; and the muriatic acid also has a tendency to decompose more gluten, of which the starch is by no means free, and which after it is once decomposed is more difficult to remove than in its original state. Moreover, muriatic acid in the glucose or sugar solution also causes the solution to caramelize at a comparatively lower temperature and in less time, and the coloring-matter thus produced necessitates the use of more bone-char to remove it; and the presence of a larger quantity of albumen makes such glucose risky to use for syrup, as it aids fermentation, thereby interfering with the keeping qualities of the syrup.

It has been known or conjectured that if sulfurous acid $(S.O_2.)$ could be successfully used as the converting agent its employment would remove many of the difficulties encountered in the manufacture of glucose and sugar, for this acid is a gas which, when heated, is highly volatile and passes off readily from the solution containing it, and therefore would not require to be neutralized, and consequently would leave no precipitates requiring to be subsequently removed and no injurious salts in the solution. Moreover, unlike muriatic acid, it decomposes very little gluten, and to a certain extent prevents or obviates the caramelizing before the conversion is finished. When all these things are taken into consideration, it will be clearly understood that there is a great advantage in employing this gas as the converting agent, tending, as it does, to produce a pure and healthy article of glucose and sugar at relatively little cost; and while it has been known that sulfurous acid has the power of converting starch into sugar and glucose it has been thought necessary to use it in large quantities, in which case it would be too expensive to prefer it even to sulfuric acid, as, if used in small quantities, it was supposed that the solution would require to remain so long under the influence of heat in the converter that the glucose would caramelize before the conversion was finished, and for the same reason would be practically unfit for making a high-converted sugar. Moreover, as sulfurous acid is highly volatile it does not readily combine with a boiling solution, as do the other acids, and consequently, as my own experiments have proved, it is practically impossible to mix the gas with the hot solution in the manner that other converting agents have been applied, and if imperfectly mixed the conversion is imperfect, the starch at the top of the solution being converted in whole or in part and on the way to caramelization before the starch lower down is affected sufficiently or has reached the point of conversion.

I have discovered by practical experiment a method of employing sulfurous acid by which I can make a uniform conversion of starch into glucose or sugar in the same short length of time as can be done with sulfuric acid or muriatic acid and by which all the difficulties above mentioned are overcome, and my new method consists, briefly stated, in charging the starch solution with the sulfurous-acid gas before said solution is heated. In the cold state the starch solution more readily absorbs the gas and holds it, and if the charging of the starch be done under a vacuum, which is the preferable method, the sulfurous acid will be purer, as this will prevent as much as possible the sulfurous acid being converted by contact with the air into sulfuric acid. When the starch has been thus charged with the gas, I boil it under, say, forty pounds pressure, the mass of starch and its contained gas being mechanically kept mixed together until the point of conversion is reached, when it will be found that the conversion has been uniform and even throughout the mass before any caramelization takes place. The pressure being removed, the volatile heated gas will readily escape from the mass and leaves no injurious precipitate or salt behind, and the escaping gas itself may be collected by being brought into contact with cold water, and a solution of sulfurous acid thus produced or saved for use in steeping the corn preparatory to the making of the starch, whereby the cost of the process is materially diminished.

My method is specially valuable in the production of grape-sugar of a high degree of purity. Heretofore, as far as I am aware, the highest purity of sugar reached by the use of muriatic acid as the converting agent was ninety-two per cent., and to reach this degree it was necessary to make the starch solution very thin or watery, as a rule, (6° Baumé at a temperature of 60° Fahrenheit.) After the point of ninety-two per cent. was reached the liquor began to caramelize and the conversion had to be stopped at that point, whereas by my method, without making the starch so thin, I am able to continue the converting process until all the dextrine is converted into sugar and obtaining ninety-seven per cent., leaving only about three per cent. of impurities to be removed by aid of the bone-char and centrifugals to produce a chemically-pure article.

In order that the same may be clearly understood, I will describe my process in conjunction with the diagram or accompanying drawing.

In this diagram, A A' are the two vacuum mixing-tanks in which the cold solution of starch is to be charged with the converting agent, sulfurous-acid gas. These tanks are shown arranged one above the other. The starch is first fed into the upper tank A through the feed-pipe $A^2$, falling upon a perforated splash-plate $A^3$, which divides it and causes it to fall into the tank in fine streams to bring every part into contact more readily with the gas which the tank-chamber A contains.

$A^4$ is a vacuum-pump for pumping the air out of the tank-chamber A to produce a more or less perfect vacuum in the tank A and also in the tank A', the latter by means presently indicated. A feed-pipe $A^5$ extends from the bottom of tank-chamber A into the top of tank-chamber A' and extends down into said latter chamber to a point something below the middle of said chamber. This pipe is provided with a cut-off valve $A^6$, the arrangement being such as will be seen and readily understood, that the starch solution contained in tank-chamber A may at any time be fed therefrom into tank-chamber A', in which latter chamber the starch solution should rise above the lower end of the feed-pipe $A^5$. The relative depths or quantities of the starch solution in respect to tank-chambers A and A', to be in proper working condition, are indicated by the dotted lines drawn horizontally across said tank-chambers. B is a common sulfur-furnace, such as are ordinarily in use in glucose and sugar factories, for burning sulfur and generating sulfurous acid. A pipe B' conveys the sulfurous acid from this furnace to a perforated coil $B^2$, placed in the bottom of tank-chamber A', and a pipe $B^3$, passing from the upper portion of tank-chamber A', conveys such gas as is contained in tank-chamber A' to a perforated coil $B^4$, placed in the bottom of tank-chamber A. Now when the feed-pipes $A^2$ $A^6$ are closed and the vacuum-pump $A^4$ is operated a vacuum is created in the tank-chamber A above the starch solution in said chamber, and thereupon the air or gas contained in pipe $B^3$ begins to pass up from the perforated coil $B^4$ toward the pump and through the starch in said tank-chamber, and as this action tends to produce a vacuum in the upper part of tank-chamber A' the gaseous contents of the pipe B' begin to be drawn from the furnace up through the coil $B^2$ and through the starch solution in the tank-chamber A', whereby the starch solution in both chambers is permeated by the gas drawn from the sulfur-furnace, and, as will be readily understood, this same action will take place when the valves in the feed-pipes $A^2$ and $A^5$ are open, provided the feed-pipe $A^2$ is filled with starch at the time and the feed-pipe $A^5$ submerged at its lower end in the starch contained in the chamber A', so that the operation of charging the starch can be continued simultaneously with the operation of feeding the starch into the upper tank-chamber, or from thence into the lower tank-chamber, or both.

C is the converting-tank, made in the form of a horizontal cylinder, mounted on central trunnions to be revolved by the band-wheel C'. A steam-pipe D enters this cylinder through a stuffing-box at one end, and inside the cylinder is bent, as shown, and extended in a perforated portion D'. At $d$ the end of this pipe is plugged, and joined or continued by the pipe E, which passes out through a stuffing-box in the other trunnion of the cylinder joining the pipe E'. The inner end of pipe E is furnished with a common check-valve $E^2$, opening into the pipe from the cylinder and normally held closed by a spring or other means. A cut-off valve $E^3$ is located in the pipe E'. A pump F is connected with the lower tank-chamber A' by a pipe F', and its outlet-pipe $F^2$ is so arranged that by means of the coupling $F^3$ it may be connected to the short feed-pipe $F^4$ of the converting-cylinder C when the latter is standing still and disconnected when it is desired to revolve said cylinder. The pipe E' passes into the cooling-tank G, and from the upper portion of this tank a gas-pipe H leads to the chamber J, the upper end of said chamber J being provided with a series of splash-plates $j$, and a stream of cold water is kept playing in this chamber down over the splash-plates and out of the exit J'. This arrangement is such that the cold-starch solution from the lower tank-chamber A' may, after it is fully charged with the reducing-gas, be pumped into the converting-cylinder C, and therein by the revolution of said cylinder subjected to agitation, and the heating action of direct steam blowing into it through the pipe D', a pressure of about forty pounds to the square inch being maintained in said converting-cylinder until the starch has reached the point of conversion into glucose or sugar. When the starch is fully converted, the valve $E^3$ in the pipe E' is opened, whereupon the pressure in the cylinder C forces open the check-valve $E^2$ and the liquid contents of the cylinder flow through the pipe E into the pipe E' and are delivered into the receiving-tank G. In this tank G, the pressure being removed, the heated and volatile sulfurous-acid gas rises from the mass and passes through the pipe H into the collecting-chamber J, where it is caught by the trickling stream of cold water, and the most of it enters into solution with said water, and this solution of sulfurous-acid gas flows down out of exit J' and is collected and saved for use in steeping the corn of which the starch is to be manufactured.

It will be seen that the apparatus for practicing my improved method or process is exceedingly simple and compact, and also so arranged that the conduct of the process may be practically continuous.

Although I have described and shown an apparatus suitable for carrying out the process, I by no means desire to limit myself to the use of such apparatus, as the process may be carried on by a great variety of appliances, the essential thing being to charge the starch with the gaseous converting agent before the starch is heated and then to heat the starch to the point of conversion, substantially as above described, by any suitable appliance or apparatus.

I claim—

1. The process of converting starch into glucose or sugar, which consists in charging the starch solution in a cold state with a gaseous converting agent, such as sulfurous acid, and subsequently heating the starch under pressure to the point of conversion, substantially as specified.

2. The process of converting starch into glucose or sugar, which consists in charging the starch solution in a cold state with a gaseous converting agent such as sulfurous acid, said gaseous converting agent being drawn into the starch under a vacuum, and subsequently heating the starch under pressure to the point of conversion, substantially as specified.

3. The process of converting starch into glucose or sugar, which consists in charging the starch solution in a cold state with a gaseous converting agent, such as sulfurous acid, subsequently heating the starch under pressure to the point of conversion, subsequently relieving the pressure from the product and collecting the sulfurous acid which rises therefrom in water to form a solution, and save the same, substantially as specified.

4. The apparatus for charging the cold-starch solution with sulfurous acid, consisting of two vacuum-chambers connected together, so that the starch will feed from one to the other, a sulfurous-acid generator connected to the bottom of one of the chambers, and a gas connection from the upper part of this chamber to the bottom of the other chamber, substantially as specified.

5. The combination of the sulfurous-acid-gas generator, means for delivering said gas from the generator to the charging tank or tanks, said charging tank or tanks adapted to contain a cold solution of starch, and to charge said solution with the gas, the converter consisting of a closed chamber adapted to contain the solution of starch charged with the gas and to heat the same under pressure, means, as a pump, for conveying the charged starch solution from the charging tank or tanks to the converter, and a receiving-tank connected to the converter, substantially as specified.

6. The combination of the sulfurous-acid-gas generator, means for delivering said gas from the generator to the charging tank or tanks, said charging tank or tanks adapted to contain a cold solution of starch, and to charge said solution with the gas, the converter consisting of a closed chamber adapted to contain the solution of starch charged with the gas and to heat the same under pressure, means, as a pump, for conveying the charged starch solution from the charging tank or tanks to the converter, and a receiving-tank connected to the converter, said receiving-tank being closed to confine the gas, and a gas-collector wherein the gas freed by the heat in the converter is collected in solution in water, and a connection between the receiving-tank and the gas-collector for conveying the gas to the collector, substantially as specified.

LOUIS P. BAUER.

Witnesses:
H. M. MUNDAY,
S. E. CURTIS.